US005552976A

United States Patent [19]
Munro et al.

[11] Patent Number: 5,552,976
[45] Date of Patent: Sep. 3, 1996

[54] EMI FILTER TOPOLOGY FOR POWER INVERTERS

[75] Inventors: James L. Munro, Severna Park; David L. Schantz, Jr., Ellicott City, both of Md.

[73] Assignee: Northrop Grumman Corporation, Los Angeles, Calif.

[21] Appl. No.: 258,153

[22] Filed: Jun. 10, 1994

[51] Int. Cl.$^6$ .................................................. H02M 1/14
[52] U.S. Cl. ............................... 363/39; 363/17; 363/132
[58] Field of Search .................................. 363/17, 39, 40, 363/41, 98, 132

[56] References Cited

U.S. PATENT DOCUMENTS

| | | | |
|---|---|---|---|
| 4,199,807 | 4/1980 | Crowe et al. | 363/132 |
| 4,901,216 | 2/1990 | Small | 363/98 |
| 4,904,918 | 2/1990 | Bailey et al. | 363/39 |
| 4,922,397 | 5/1990 | Heyman | 363/17 |

FOREIGN PATENT DOCUMENTS 4230510  9/1993  Germany.
2242580  10/1991  United Kingdom.

OTHER PUBLICATIONS

EPE'93, Sep. 1993, T. Schutze, et al., "Low Floor Trams with IGBT-3-level Inverter", pp. 92-96.
EPE'91, 1991, Tadros, et al., "Design Aspects of High Power PWM Inverters with IGBT", pp. 2-083-2-088.
EPE'89, Oct. 1989, W. Leonhard, et al., "DPI-Fed Induction Motor Drive for Railway Applications—Braking above Rated Speed at Rated Torque", pp. 69-73.

Primary Examiner—Peter S. Wong
Assistant Examiner—Y. Jessica Han

[57] ABSTRACT

A EMI filter for an electric vehicle propulsion system, comprising a first and second capacitive element electrically connected in parallel with first and second power conductors, an inductive element electrically connected in series with the first power conductor and separating the first and second capacitive elements, and first and second junctions electrically connecting the second capacitive element to an electronic switch, wherein the sum of intrinsic inductances of the first and second junctions is less than the intrinsic inductance of the second capacitive element.

25 Claims, 8 Drawing Sheets

EMI FILTER TOPOLOGY FOR POWER INVERTERS

RELATED APPLICATIONS

The following identified U.S. patent applications are filed on the same date as the instant application and are relied upon in this application.

U.S. patent application entitled "Flat Topping Concept" bearing U.S. Ser. No. 08/258,295; Issued, and filed on the same date herewith;

U.S. patent application entitled "Electric Induction Motor And Related Method Of Cooling" bearing U.S. Ser. No. 08/442,708; Pending and filed on the same date herewith;

U.S. patent application entitled "Automotive 12 Volt System For Electric Vehicles" bearing U.S. Ser. No. 08/258,142; Pending and filed on the same date herewith;

U.S. patent application entitled "Direct Cooled Switching Module For Electric Vehicle Propulsion System" bearing U.S. Ser. No. 08/258,027; Pending and filed on the same date herewith;

U.S. patent application entitled "Electric Vehicle Propulsion System" bearing U.S. Ser. No. 08/258,301; Pending and filed on the same date herewith;

U.S. patent application entitled "Speed Control and Bootstrap Technique For High Voltage Motor Control" bearing U.S. Ser. No. 08/258,294; abandoned and filed on the same date herewith;

U.S. patent application entitled "Vector Control Board For An Electric Vehicle Propulsion System Motor Controller" bearing U.S. Ser. No. 08/258,306; Pending and filed on the same date herewith;

U.S. patent application entitled "Digital Pulse Width Modulator With Integrated Test And Control" bearing U.S. Ser. No. 08/258,305; and filed on the same date herewith;

U.S. patent application entitled "Control Mechanism For Electric Vehicle" bearing U.S. Pat. No. 5,463,291, and filed on the same date herewith;

U.S. patent application entitled "Fault Detection Circuit For Sensing Leakage Currents Between Power Source And Chassis" bearing U.S. Ser. No. 08/258,179; and filed on the same date herewith;

U.S. patent application entitled "Electric Vehicle Relay Assembly" bearing U.S. Ser. No. 08/258,179; and filed on the same date herewith;

U.S. patent application entitled "Three Phase Power Bridge Assembly" bearing U.S. Ser. No. 08/258,033; Pending and filed on the same date herewith;

U.S. patent application entitled "Electric Vehicle Propulsion System Power Bridge With Built-In Test" bearing U.S. Ser. No. 08/258,034; and filed on the same date herewith;

U.S. patent application entitled "Method For Testing A Power Bridge For An Electric Vehicle Propulsion System" bearing U.S. Ser. No. 08/258,178; and filed on the same date herewith;

U.S. patent application entitled "Electric Vehicle Power Distribution Module" bearing U.S. Ser. No. 08/258,157; and filed on the same date herewith;

U.S. patent application entitled "Electric Vehicle Chassis Controller" bearing U.S. Ser. No. 08/258,628; and filed on the same date herewith;

U.S. patent application entitled "Electric Vehicle System Control Unit Housing" bearing U.S. Ser. No. 08/258,156; Abandoned and filed on the same date herewith;

U.S. patent application entitled "Low Cost Fluid Cooled Housing For Electric Vehicle System Control Unit" bearing U.S. Ser. No. 08/258,299; Abandoned and filed on the same date herewith;

U.S. patent application entitled "Electric Vehicle Coolant Pump Assembly" bearing U.S. Ser. No. 08/258,296; and filed on the same date herewith;

U.S. patent application entitled "Heat Dissipating Transformer Coil" bearing U.S. Ser. No. 08/258,141; and filed on the same date herewith;

U.S. patent application entitled "Electric Vehicle Battery Charger" bearing U.S. Ser. No. 08/258,154; and filed on the same date herewith.

BACKGROUND OF THE INVENTION

1. Field of the Invention

The present invention relates to EMI filters. More particularly, the present invention relates to an EMI filter for use in an electric vehicle propulsion system. While the invention is subject to a wide range of applications, it is especially suited for use in electric vehicles that utilize batteries or a combination of batteries and other sources, e.g., a heat engine coupled to an alternator, as a source of power, and will be particularly described in that connection.

2. Description of the Related Art

For an electric vehicle to be commercially viable, its cost and performance should be competitive with that of its gasoline-powered counterparts. Typically, the vehicle's propulsion system and battery are the main factors which contribute to the vehicle's cost and performance competitiveness.

Generally, to achieve commercial acceptance, an electric vehicle propulsion system should provide the following features: (1) vehicle performance equivalent to typical gasoline-powered propulsion systems; (2) smooth control of vehicle propulsion; (3) regenerative braking; (4) high efficiency; (5) low cost; (6) self-cooling; (7) electromagnetic interference (EMI) containment; (8) fault detection and self-protection; (9) self-test and diagnostics capability; (10) control and status interfaces with external systems; (11) safe operation and maintenance; (12) flexible battery charging capability; and (13) auxiliary 12 volt power from the main battery. In prior practice, however, electric vehicle propulsion system design consisted largely of matching a motor and controller with a set of vehicle performance goals, such that performance was often sacrificed to permit a practical motor and controller design. Further, little attention was given to the foregoing features that enhance commercial acceptance.

For example, a typical conventional electric vehicle propulsion system comprises, among other things, a power bridge including high-power switching transistors for supplying current to the windings of a motor. In operation, the power bridge rapidly switches high currents from the power source creating substantial EMI as, for example, voltage spikes, harmonic currents, and parasitic oscillations. This conductive EMI will cause power conductors interconnecting the power bridge and other components to act as radiators, emitting radiative EMI that can interfere with on board electronic equipment such as computers and radio receivers. Likewise, in a high voltage system such as an electric propulsion system for an electric vehicle, conductive EMI can also disrupt systems operations and may damage or degrade system components.

Moreover, conventional electronic filter elements, such as an active snubber capacitor assembly, generally include resistive elements to compensate for stray inductance in the filter circuit. Such resistive elements denigrate system efficiency and generate additional heat energy. Thus, in an electric vehicle propulsion system where high efficiency and self cooling are highly desirable, such resistive elements are disadvantageous.

SUMMARY OF THE INVENTION

Accordingly, the present invention is directed to an EMI filter for use in an electric vehicle propulsion system that substantially obviates one or more of the problems due to the limitations and disadvantages of the related art.

Features and advantages of the invention will be set forth in the description which follows, and in part will be apparent from the description, or may be learned by practice of the invention. The objectives and other advantages of the invention will be realized and attained by the apparatus particularly pointed out in the written description and claims thereof as well as the appended drawings.

To achieve these and other advantages and in accordance with the purpose of the invention, as embodied and broadly described, the invention provides for an EMI filter for an electric vehicle propulsion system, comprising a first capacitive element electrically connected in parallel with first and second power conductors, and a second capacitive element having first and second terminals and an internal inductive component. The first and second terminals of the second capacitive element are electrically connected to the first and second power conductors.

The EMI filter further includes an inductive element electrically connected in series with the first power conductor such that the first inductive element separates the first and second capacitive elements. The EMI filter also includes first and second junctions electrically connecting the first and second terminals of the second capacitive element to first and second terminals of an electronic switch. The first and second junctions having first and second internal inductive components, the sum of the inductances of the first and second internal inductive components of the first and second junctions being less than the inductance of the internal inductive component of the second capacitive element.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate a presently preferred embodiment of the invention and, together with the description, serve to explain the principles of the invention. In the drawings.

DESCRIPTION OF THE PREFERRED EMBODIMENT

Reference will now be made in detail to a present preferred embodiment of the invention, an example of which is illustrated in the accompanying drawings.

Figure 1:
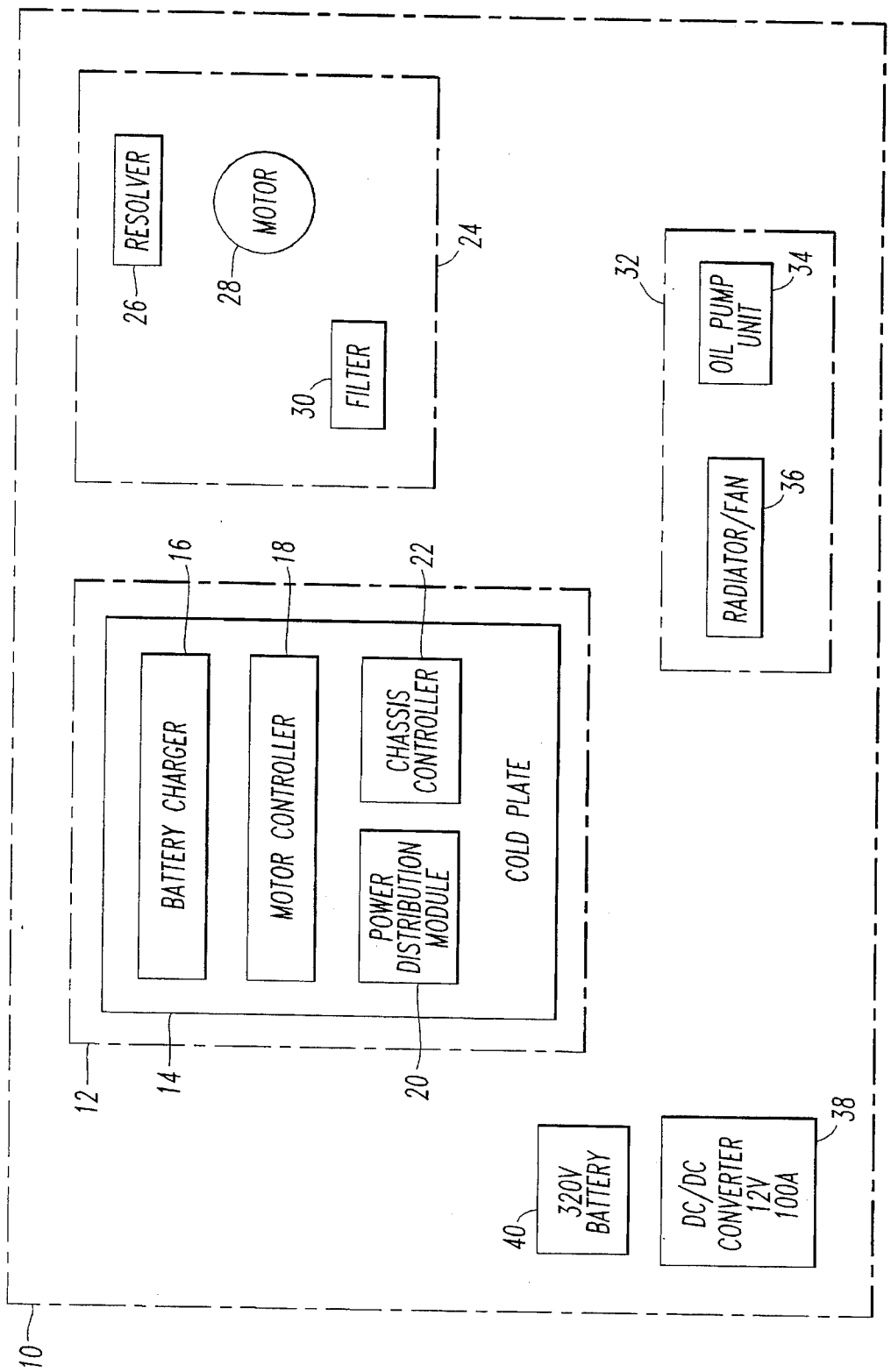
FIG. 1 is a block diagram of an electric vehicle propulsion system.

The present invention, which relates to an electric vehicle assembly, will be described with respect to an electric vehicle propulsion system 10 as shown in FIG. 1. The electric vehicle propulsion system 10 comprises a system control unit 12, a motor assembly 24, a cooling system 32, a battery 40, and a DC/DC converter 38. The system control unit 12 includes a cold plate 14, a battery charger 16, a motor controller 18, a power distribution module 20, and a chassis controller 22. The motor assembly 24 includes a resolver 26, a motor 28, and a filter 30. The cooling system 32 includes an oil pump unit 34 and a radiator/fan 36.

The battery 40 serves as the primary source of power for the electric propulsion system 10. The battery 40 comprises, for example, a sealed lead acid battery, a monopolar lithium metal sulfide battery, a bipolar lithium metal sulfide battery, or the like, for providing a 320 volt output. Preferably, the electric propulsion system 10 works over a wide voltage range, e.g., 120 volts to 400 volts, to accommodate changes in the output voltage of the battery 40 due to load or depth of discharge. However, the electric vehicle propulsion system 10 is preferably optimized for nominal battery voltages of about 320 volts.

Figure 2:
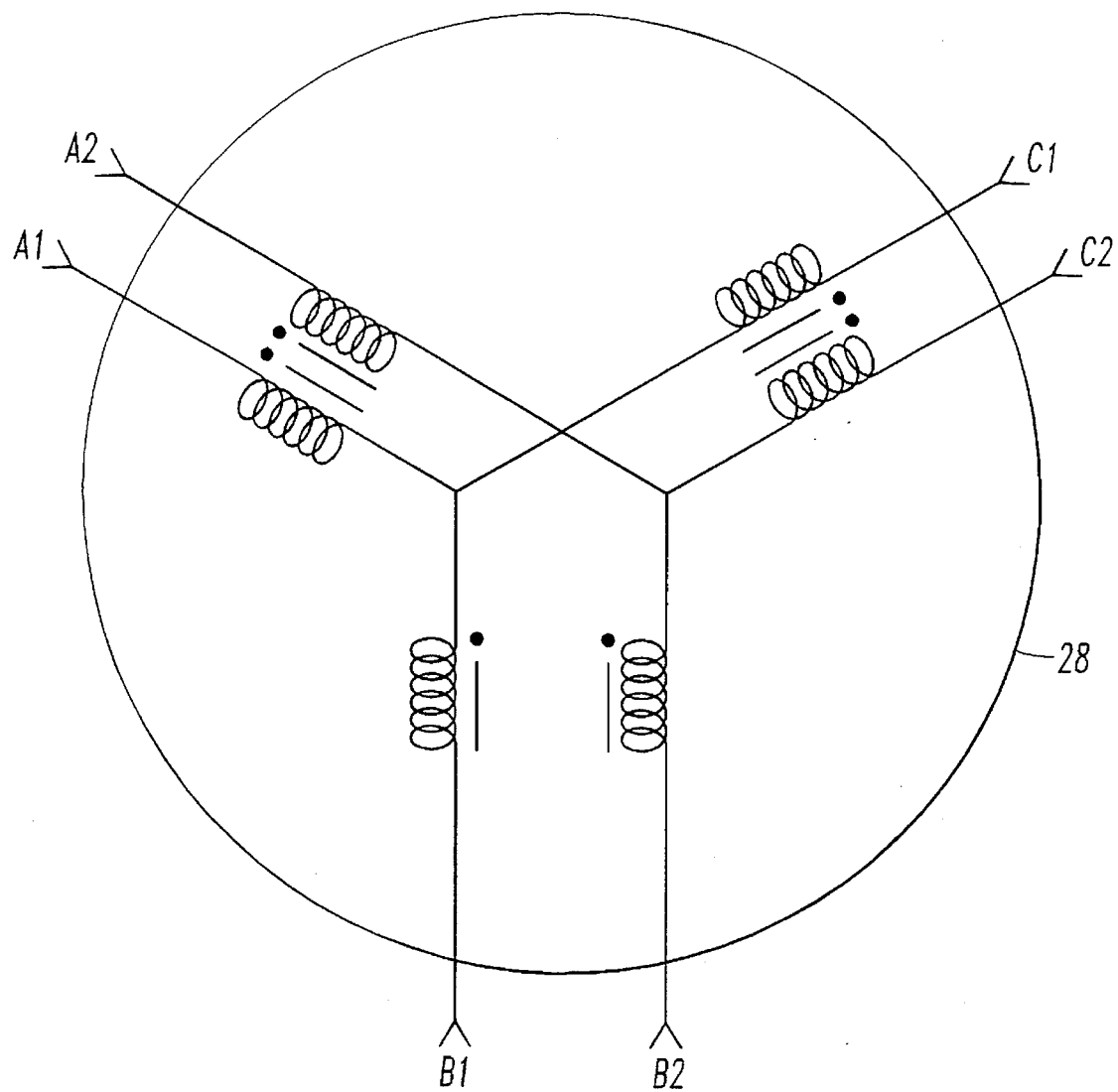
FIG. 2 is a schematic diagram of the motor of the electric vehicle propulsion system of FIG. 1.

As shown in FIG. 2, the motor 28 is a 3-phase AC induction motor having two identical, electrically isolated windings per phase (windings A1 and A2 are for the "A" phase, windings B1 and B2 are for the "B" phase, and windings C1 and C2 are for the "C" phase) for producing high torque at zero speed to provide performance comparable to conventional internal combustion engines. Preferably, the two windings in each phase of the motor 28 are aligned substantially on top of one another and are electrically in phase such that each winding provides approximately half the total power of the phase.

Figure 3:
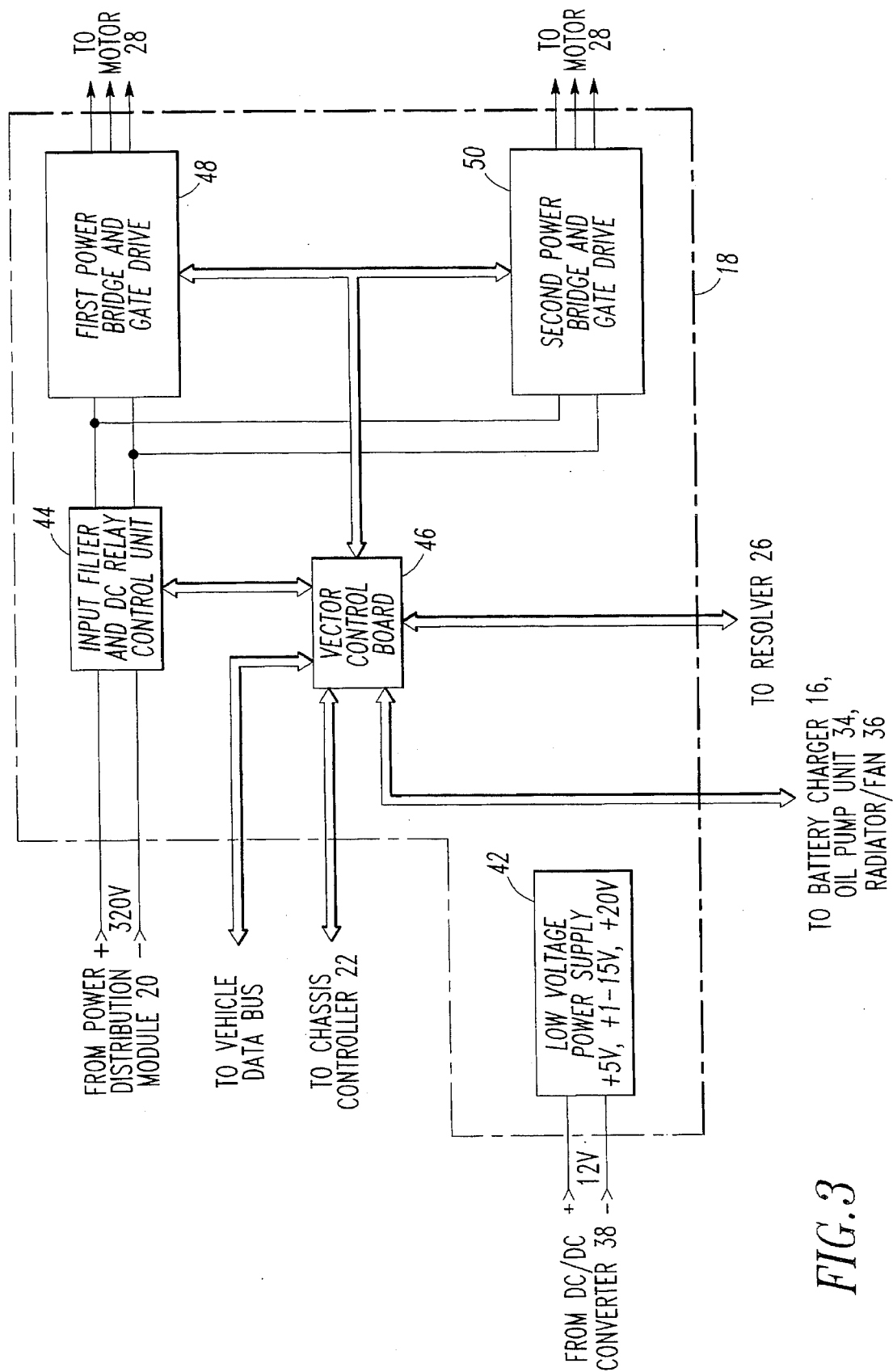
FIG. 3 is a functional diagram of the motor controller of the electric vehicle propulsion system of FIG. 1.

As shown in FIG. 3, the input filter and DC relay control unit 44, which includes some components of the EMI filter of the present invention, is included in the motor controller 18. The motor controller 18 also includes a low voltage power supply 42, a vector control board 46, and first and second power bridges 48 and 50, respectively.

The low voltage power supply 42 converts the 12 volt output from the DC/DC converter 38 to provide +5 V, +/−15 V, and +20 V outputs to the input filter and DC relay control unit 44, the vector control board 46, the first power bridge 48, and the second power bridge 50. The low voltage power supply 42 can comprise a commercially available power supply as is known in the art.

The vector control board 46 comprises a microprocessor based digital and analog electronics system. As its primary function, the vector control board 46 receives driver-initiated acceleration and braking requests from the chassis controller 22. The vector control board 46 then acquires rotor position measurements from the resolver 26 and current measurements from the first and second power bridges 48 and 50, respectively, and uses these measurements to generate pulse width modulated (PWM) voltage waveforms for driving the first and second power bridges 48 and 50, respectively, to produce the desired acceleration or braking effects in the motor 28. The PWM voltage waveforms are generated in accordance with a control program which is designed to result in a requested torque output. The vector control board 46 also has the function of controlling the input filter and DC relay control unit 44, the oil pump unit 34, the radiator/fan 36, the battery charger 16, the input filter and DC relay control unit 44, built in test circuitry, vehicle communication, and fault detection.

Figure 4:
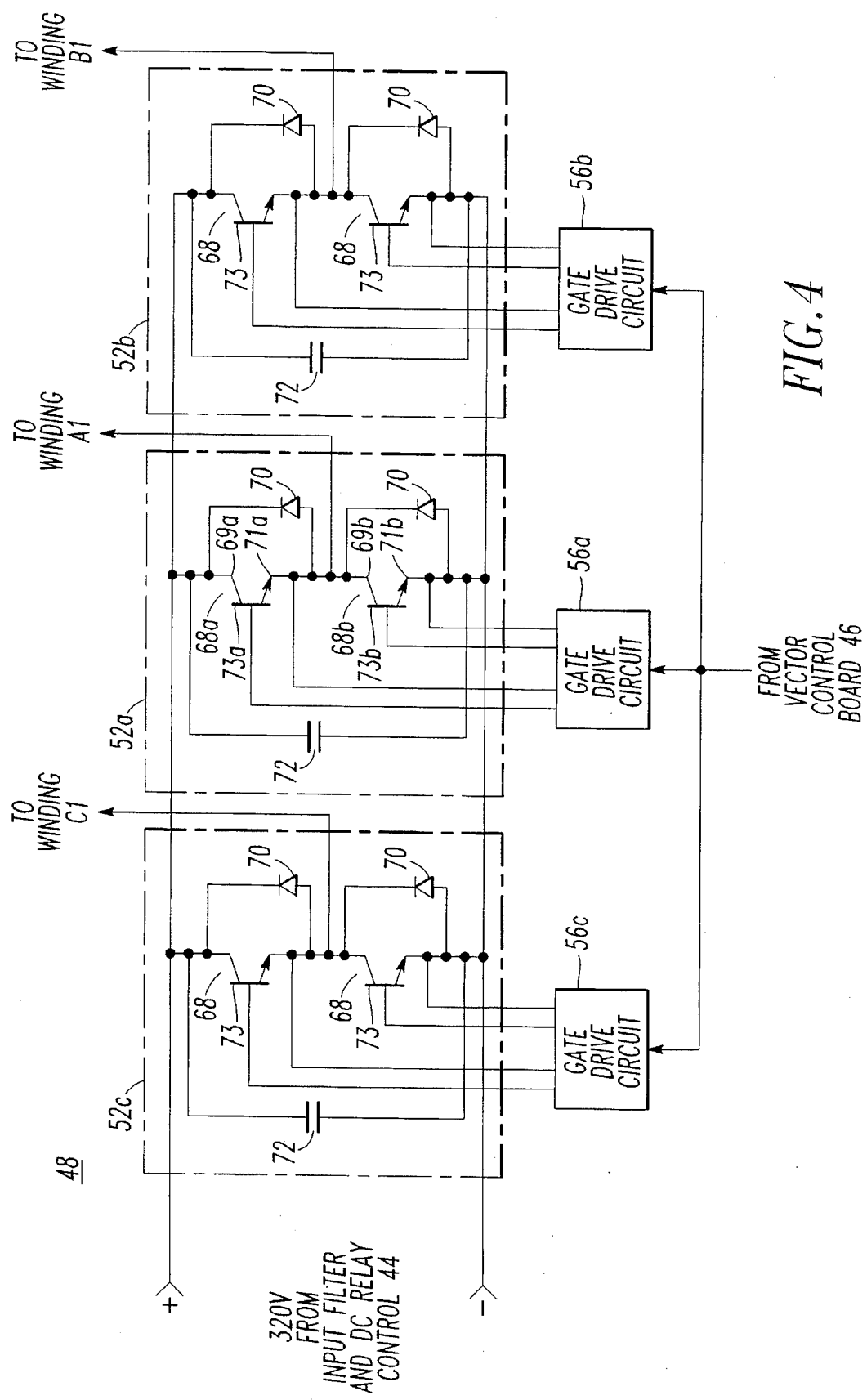
FIG. 4 is a schematic diagram of a first power bridge assembly for an electric vehicle propulsion system.
Figure 5:
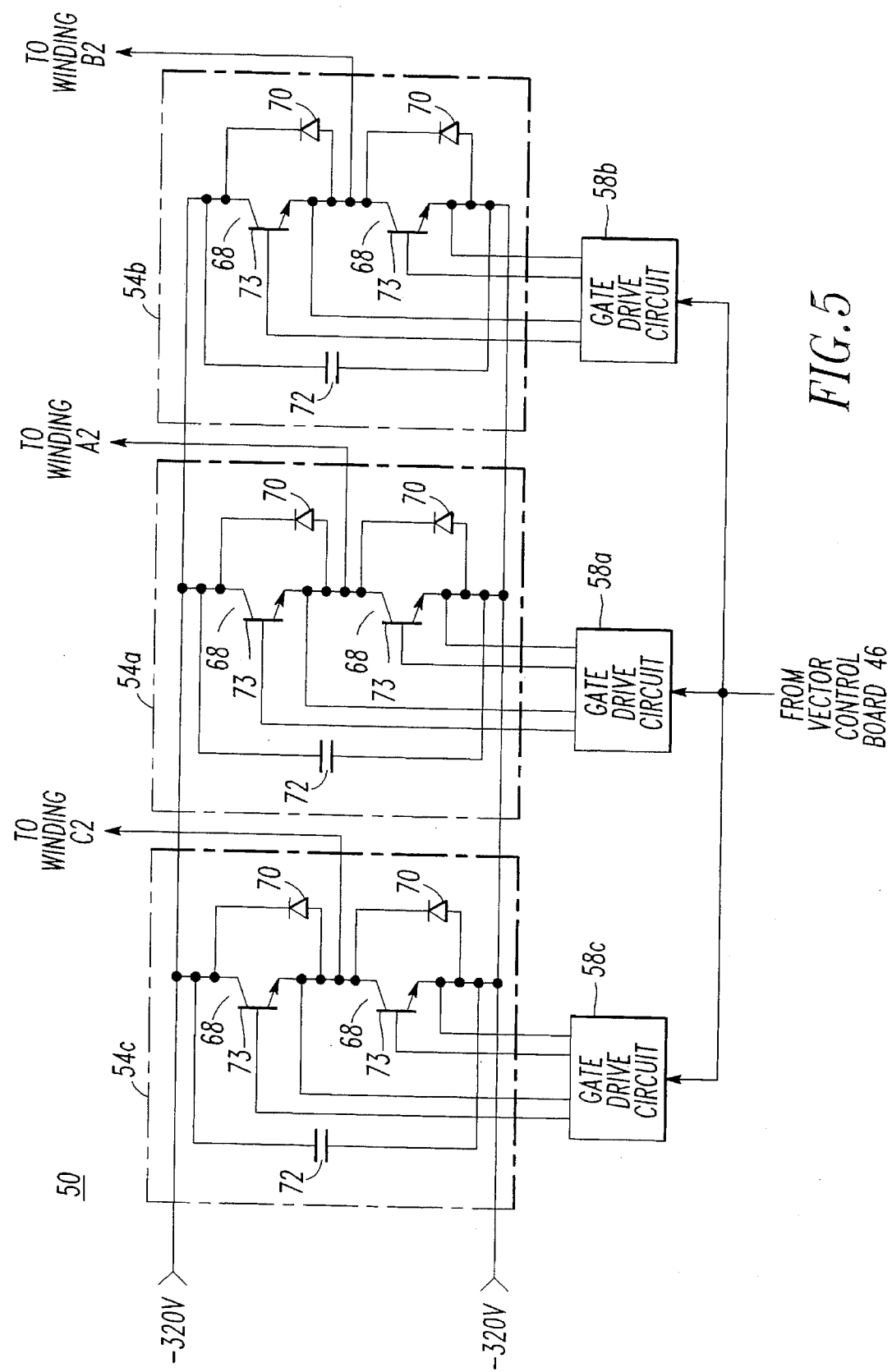
FIG. 5 is a schematic diagram of a second power bridge assembly for an electric vehicle propulsion system.

A schematic diagram of a first power bridge 48 is shown in FIG. 4, and a schematic diagram of a second power bridge 50 is shown in FIG. 5. The first and second power bridges 48 and 50 convert input direct current into output three phase alternating current. First power bridge 48 receives an input high voltage current from battery 40, preferably 340 volts, and outputs an alternating current at terminals A1, B1, and C1. Second power bridge 50 also receives an input high voltage current from battery 40, preferably 340 volts, and outputs an alternating current at terminals A2, B2, and C2.

First power bridge 48 includes three insulated gate bipolar transistor (IGBT) circuits 52a, 52b, and 52c, while second power bridge 50 includes three identical IGBT circuits 54a, 54b, and 54c. Preferably, three IGBT circuits 52a, 52b, and 52c and three IGBT circuits 54a, 54b, and 54c produce a three phase alternating current at six outputs. In each IGBT circuit 52a–54c, two IGBTs 68 are serially connected together. A diode 70 is connected across the current path of each IGBT 68, and a second capacitive element 72 is connected across the combined current paths of the serially connected IGBTs 68.

Referring specifically to IGBT circuit 52a, as an example, a collector 69a of IGBT 68a is electrically connected to the positive side of battery 40, an emitter 71a of IGBT 68a is electrically connected to the collector 69b of IGBT 68b, and an emitter 71b of IGBT 68b is electrically connected to the negative side of battery 40. Output terminal A1 is electrically connected to the emitter 71a of IGBT 68a and the collector 69b of IGBT 68b. Diodes 70 are connected across the current paths of IGBTs 68a and 68b.

The gates 73 of IGBTs 68 in first power bridge 48 are connected to gate driving circuits 56a, 56b, and 56c, while the gates 73 of IGBTs 68 in second power bridge 50 are connected to gate driving circuits 58a, 58b, and 58c. The gate drive circuits 56a, 56b, 56c, 58a, 58b, and 58c produce pulses which are supplied to the gates 73 of IGBTs 68 to selectively switch IGBTs 68. Thus, gate drive circuits 56a, 56b, and 56c control the timing of the switching in first power bridge 48, while gate driving circuits 58a, 58b and 58c control the timing of the switching in second power bridge 50.

The input filter and DC relay control unit 44, which includes components of the EMI filter of the present invention, comprises electrical connections for coupling a 320 volt output of the power distribution module 20 to the first and second power bridges 48 and 50, respectively. The input filter and DC relay control unit 44 further includes a relay circuit for disconnecting the coupling of the 320 volt output of the power distribution module 20 to the first and second power bridges 48 and 50, respectively, and various BIT circuits including voltage sense circuits and a chassis ground fault circuit. Preferably, the input filter and DC relay control unit 44 receives control signals from and sends status signals, e.g., BIT signals, to the vector control board 46.

Figure 6:
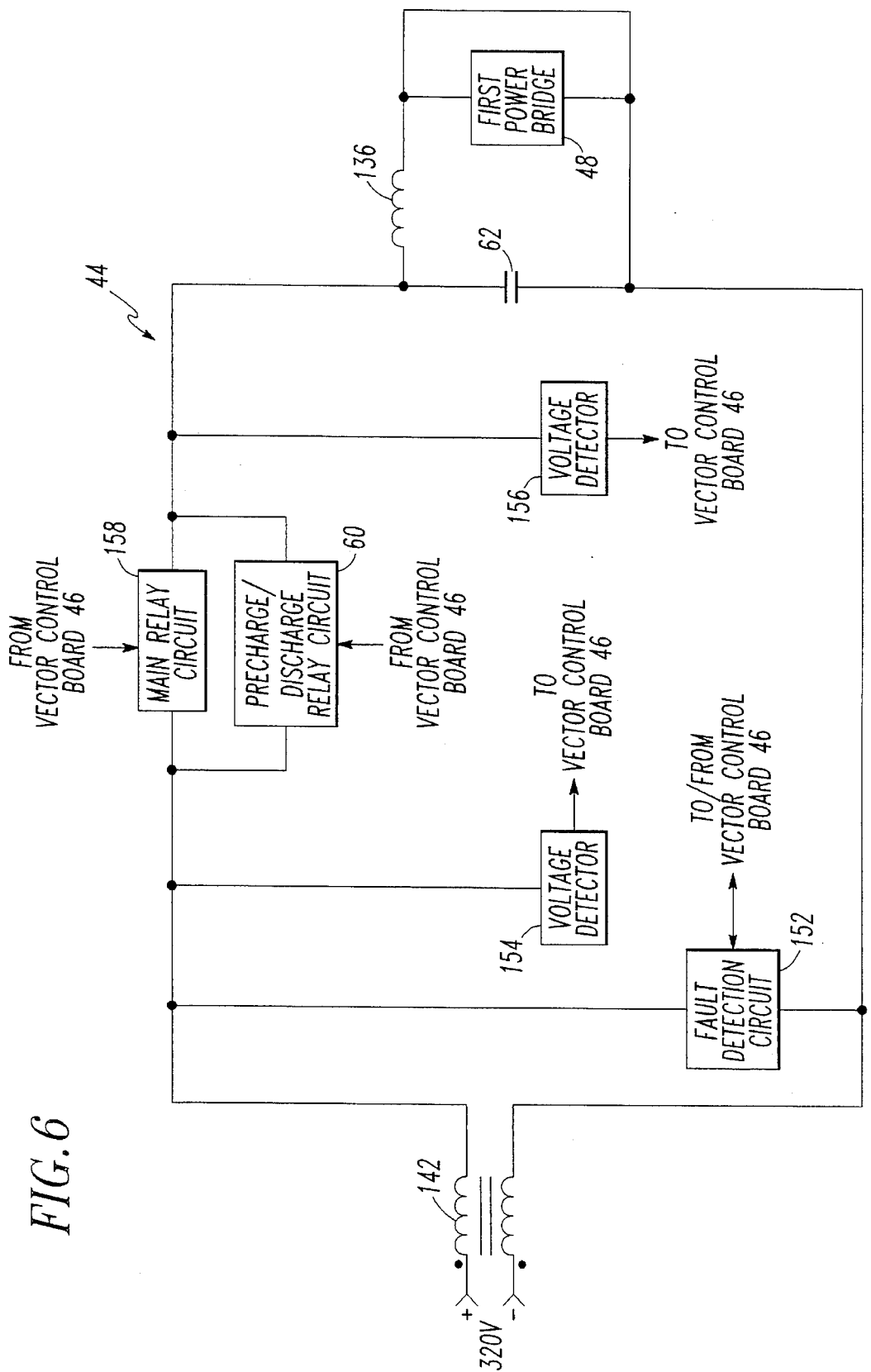
FIG. 6 is a schematic diagram of the input filter and DC relay control unit of the motor controller of FIG. 3.

FIG. 6 is an electrical diagram of the circuitry comprising the input filter and DC relay control unit 44. As described above, the circuitry couples the 320 volt output of the power distribution module 20 to the first and second power bridges 48 and 50. The input filter and DC relay control unit 44 includes a fault detection circuit 152, first and second voltage detectors 154 and 156, a main relay circuit 158, and a precharge/discharge relay circuit 60. The fault detection circuit 152 senses leakage current to the vehicle chassis and receives control signals from and sends status signals to the vector control board 46. The first voltage detector 154 senses the input voltage to the input filter and DC relay control unit 44 and sends status signals to the vector control board 46. The second voltage detector 156 senses the voltage being supplied from the main relay circuit 158 and the precharge/discharge relay circuit 60 to the first capacitive element 62. The second voltage detector 156 also sends status signals to the vector control board 46. In response to control signals from the vector control board 46, the main relay circuit 158 selectively connects and disconnects the 320 volt output of the power distribution module 20 to the first and second power bridges 48 and 50, respectively. The input filter and DC relay control unit 44 further includes components of the EMI filter of the present invention including an inductive element 106, a first capacitive element 62, and a common mode choke 142.

Figure 7:
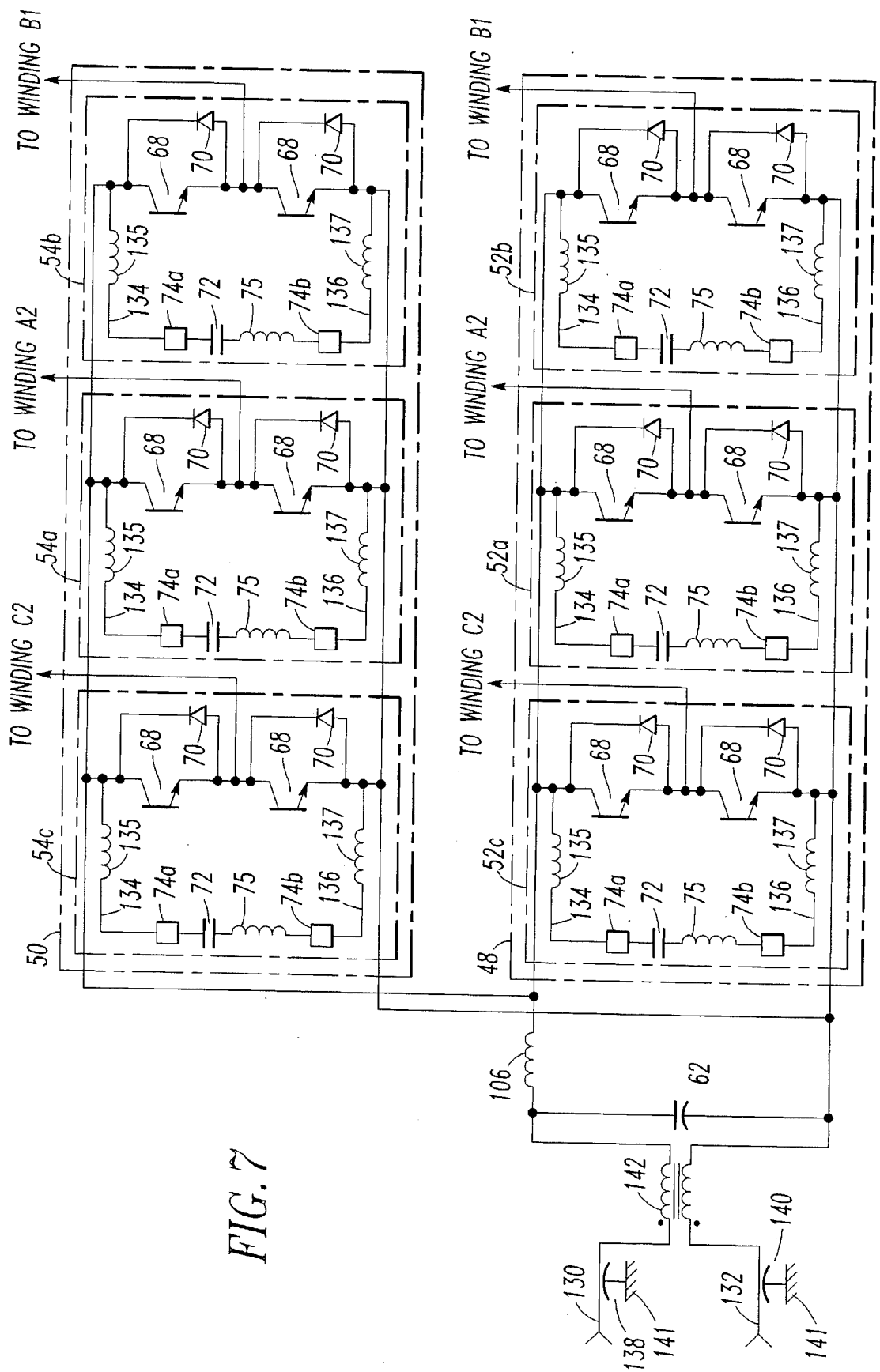
FIG. 7 is a schematic diagram of the EMI filter of the input filter and relay control unit of FIG. 6 in accordance with the preferred embodiment of the present invention.

FIG. 7 is a schematic diagram of an embodiment of the EMI filter of the present invention including connections to the serially connected IGBTs 68 of the first and second power bridges 48 and 50, respectively. The EMI filter of the present invention comprises a first capacitive element 62 electrically connected in parallel with first and second power conductors 130 and 132, respectively. Preferably, the first capacitive element 62 is a polarized capacitor such as an electrolytic capacitor having a capacitance of about 3500 microfarads. The first and second power conductors 130 and 132, respectively, provide electrical connections to the power distribution module 20 for electrical connection to the battery 40 of the electric vehicle propulsion system 10. The first and second power conductors 130 and 132 preferably comprise a combination of insulated power cables, laminated bus bar sections, and input terminals (described below).

The EMI filter of the present invention further comprises six second capacitive elements 72. One second capacitive element 72 is associated with each of the IGBT circuits 52a, 52b, 52c, 54a, 54b, and 54c. Each second capacitive element 72 includes first and second terminals 74a and 74b, respectively. Each second capacitive element 72 is preferably comprised of a plurality of film capacitors such as polypropylene film capacitors. Each second capacitive element 72 includes an internal inductive component 75. The internal inductive component 75 of the second capacitive element 72 is the stray or intrinsic inductance of the component. The film capacitors of the second capacitive element 72 are electrically interconnected and physically arranged so as to reduce the inductance of the internal inductive component 75 of the second capacitive element 72. Preferably, the inductance of the internal inductive component 75 of each second capacitive element 72 is less than 10 nanohenries and the capacitance of the second capacitive element 72 is about 45 microfarads. Component model no. MP9-11049K from Electronic Concepts, Inc. of Eatontown, N.J. is suitable for use as the second capacitive element 72.

The first and second terminals 74a and 74b of each second capacitive element 72 are electrically connected to associated serially connected IGBTs 68 by associated first and second junctions 134 and 136, respectively. Each of the first and second junctions 134 and 136 have first and second internal inductive components 135 and 137, respectively. The first and second internal inductive components 135 and 137 of the first and second junctions 134 and 136, respectively, are the stray or intrinsic inductance of those components. The first and second junctions 134 and 136, respectively, are configured to reduce their associated internal inductive components. Preferably, the sum of the inductances of the first and second internal inductive components 135 and 137 of each pair of first and second junctions 134 and 136, respectively, are less than the inductance of the internal inductive component 75 of each associated second capacitive element 72. For example, the sum of the inductances of the first and second internal inductive components 135 and 137 of each pair of first and second junctions 134 and 136, respectively, is less than about 10 nanohenries.

Figure 8:
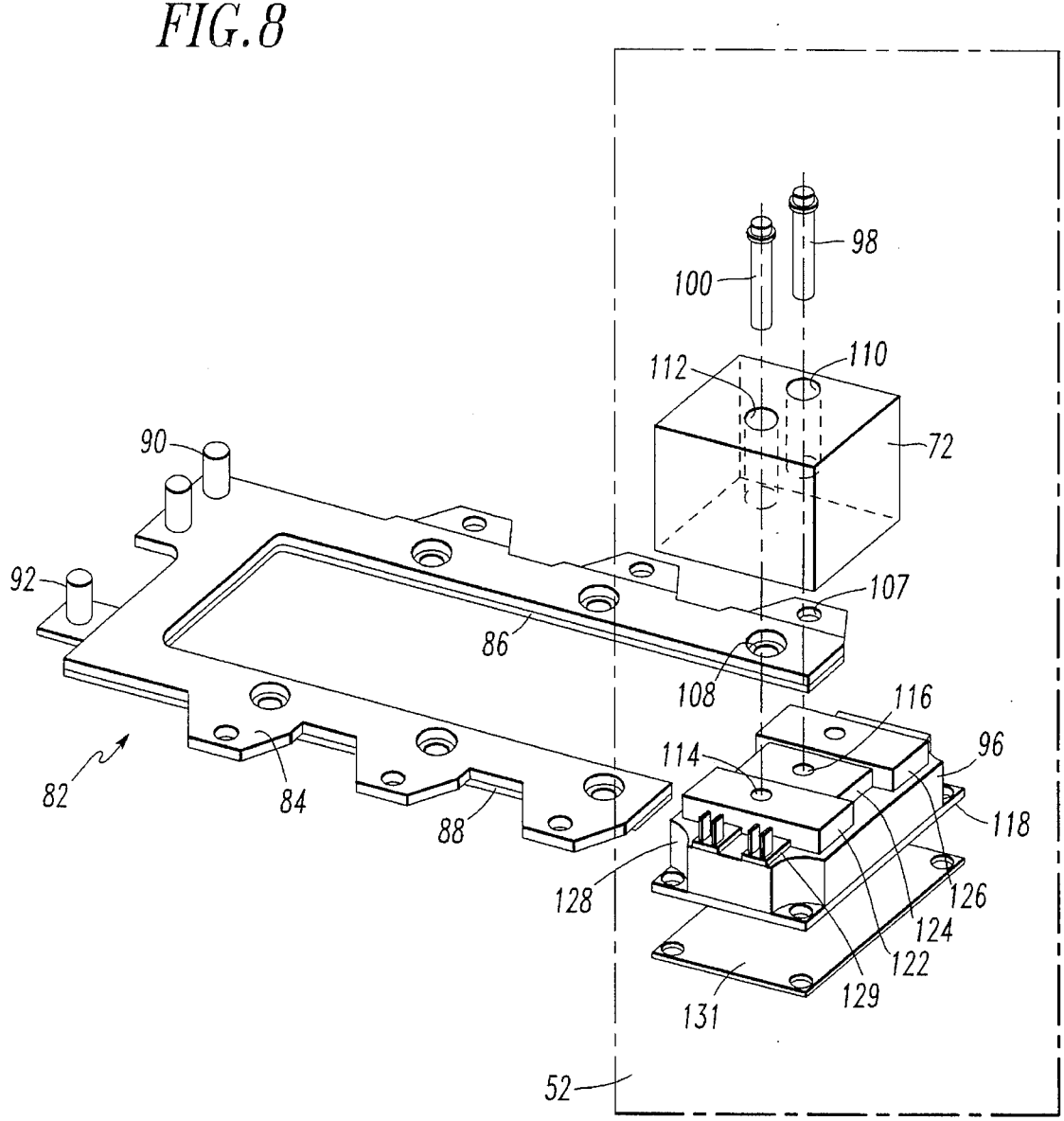
FIG. 8 is an exploded view of a portion of a dual power bridge assembly for an electric vehicle propulsion system.

To reduce the inductance of the first and second internal inductive components 135 and 137 of each pair of first and second junctions 134 and 136, respectively, the second capacitive elements 72 associated with each pair of first and second junctions 134 and 136, respectively, are preferably joined to their associated serially connected IGBTs 68 as shown in FIG. 8.

FIG. 8 shows an exploded view of dual power bridge 48 with one of six IGBT circuits 52 shown. A description of this assembly including capacitors 72 is set forth below and is also set forth in copending U.S. patent application entitled "Three Phase Power Bridge Assembly" bearing U.S. Ser. No. 08/258,033 and filed on the same date herewith. A dual power bridge 48 is assembled on a laminated bus bar 82. An upper plate 84 of the bus bar 82 electrically connects to the power distribution module 20 through input terminal 90, and a lower plate 86 of the bus bar also electrically connects to the power distribution module 20 through input terminal 92, whereby the upper plate 84 and input terminal 90 form a part of the second power conductor 132 and the lower plate 86 and input terminal 90 form a part of the first power conductor 130. An insulation layer 88 is sandwiched between the upper and lower plates. Electrical switches and capacitors sandwich the laminated bus bar 82. With this structure, two fasteners, one for positive voltage and one for negative voltage, can connect the bus bar 82, capacitors, and switches both electrically and mechanically.

As shown in FIG. 8, the bus bar 82 is sandwiched between a second capacitive element 72 and an IGBT package 96 containing IGBTs 68 and diodes 70. Two serially connected IGBTs 68 and associated diodes 70 are encased in electrically insulating potting compound, such as a plastic, to form IGBT package 96. FIG. 8 shows a U-shaped bus bar 82 which is preferably used in the dual power bridge embodiment. Each side of the bus bar will connect three IGBT packages 96 with their associated second capacitive elements 72. In an alternative single power bridge embodiment, a straight line bus bar is preferably used to connect three IGBT packages 96 with their associated second capacitive elements 72. In the dual power bridge embodiment, an IGBT package manufactured by Toshiba Part U.S. Ser. No. MG300J2YS45 may be used, and in the single power bridge embodiment an IGBT package manufactured by Powerex Part No. CM400DY-12H may be used.

A conductive base plate 118 is attached to one side of IGBT package 96, and electrical terminals 122, 124, and 126 are attached to the opposite side of IGBT package 96. An electrically and thermally conductive gasket 131 is inserted between the IGBT package 96 and a cooling plate (not shown).

Using IGBT circuit 52a, of FIG. 4 as an example, electrical terminal 122 is connected to the emitter of IGBT 68b, electrical terminal 124 is connected to the collector of IGBT 68a, and electrical terminal 126 is connected to the emitter of IGBT 68a and the collector of IGBT 68b. Holes 114 and 116 are formed in electrical terminals 122 and 124 respectively. The holes 114 and 116 may be formed, for example, by drilling or molding. The gate drive (FIG. 4) circuit 56a connects to terminals 128 and 129.

The second capacitive element 72 includes holes 110 and 112 which are exposed to first and second terminals 74a and 74b (FIG. 7), respectively, of the second capacitive element 72. The second capacitive element 72, bus bar 82, and IGBT package 96 are connected together with electrically conductive connectors 98 and 100 (FIG. 8). Connector 98 fits through hole 110, lower plate hole 107, and hole 116. Connector 100 fits through hole 112, upper plate hole 108, and hole 114. Connectors such as rods, clips, bolts, rivets, or screws may be used, although screws are preferred. If screws are used as shown in FIG. 8, the holes 114 and 116 are threaded.

In this way, the first and second junctions 134 and 136 are arranged so that the IGBT packages 96 abut their associated second capacitive element 72. This minimizes the length of the radiative loop, reducing radiative EMI.

The EMI filter of the present invention further comprises an inductive element 106 in parallel with the first power conductor 130. The inductive element 106 comprises a coil inductor with a ferrite core as is known in the art. The inductance of the inductor element 106 is preferably about 10 microhenries. The inductive element 106 separates the first capacitive element 62 from the second capacitive elements 72. By inductively isolating the first capacitive element 62 from the second capacitive elements 72, the first and second power bridges 48 and 50, respectively, upon switching, draw the majority of current from associated second capacitive elements 72, ensuring the majority of current is drawn from a small radiative loop with relatively minor stray inductance, thus reducing both radiative EMI and conductive EMI caused by, for example, parasitic oscillations.

The EMI filter of the present invention further comprises a common mode choke 142 (FIG. 7) and first and second feedthrough capacitors 138 and 140, respectively. The common mode choke 142 is electrically connected in parallel with the first and second power conductors 130 and 132, respectively, and has an inductance of about 10 microhenries. The common mode choke 142, formed by passing the first and second power conductors 130 and 132 through toroidal cores of ferrite material, is used to filter common mode noise from first and second power conductors. The first and second feedthrough capacitors 138 and 140 are electrically connected between the first and second power conductors 130 and 132, respectively, and a circuit common connection 141. The film capacitors each have a capacitance of about 0.4 microfarads and act to filter high frequency noise from the first and second power conductors 130 and 132. Preferably, the first and second feedthrough capacitors 138 and 140, respectively, are located near a boundary of a grounded enclosure of the motor controller (not shown) to prevent high frequency noise from being radiated to other parts of the first and second power conductors 130 and 132, respectively.

It should be apparent to those skilled in the art that various modifications and variations can be made to the present invention without departing from the spirit or scope of the invention. Thus, it is intended that the present invention cover the modifications and variations of this invention provided they come within the scope of the appended claims and their equivalents.

We claim:

1. An EMI filter for an electric vehicle propulsion system including a power source, an electronic switch having first and second terminals, and first and second power conductors electrically connecting the first and second terminals, respectively, to the power source, comprising:

a first capacitive element electrically connected in parallel with the first and second power conductors;

a second capacitive element having first and second terminals and an intrinsic inductive component, the first and second terminals being electrically connected to the first and second power conductors, respectively;

an inductive element electrically connected in series with the first power conductor, the inductive element separating the first and second capacitive elements; and first and second junctions electrically connecting the first and second terminals of the second capacitive element to the first and second terminals of the electronic switch, respectively, the first and second junctions having first and second intrinsic inductive components, respectively;

wherein a sum of inductances of the first and second intrinsic inductive components of the first and second junctions is less than an inductance of the intrinsic inductive component of the second capacitive element.

2. The EMI filter of claim 1 wherein the inductance of the intrinsic inductive component of the second capacitive element is less than 10 nanohenries.

3. The EMI filter of claim 2 wherein the first capacitive element comprises an electrolytic capacitor.

4. The EMI filter of claim 3 wherein the second capacitive element comprises a film capacitor.

5. The EMI filter of claim 4 wherein the second capacitive element comprises a polypropylene film capacitor.

6. The EMI filter of claim 4, wherein:

the first capacitive element has a capacitance of about 3500 microfarads;

the second capacitive element has a capacitance of about 45 microfarads; and the inductive element has an inductance of about 10 microhenries.

7. The EMI filter of claim 6 further comprising a first feedthrough capacitor electrically connected between the first power conductor and a circuit common connection;

a second feedthrough capacitor electrically connected between the second power conductor and the circuit common connection; and a common mode choke connected in series with the first and second power conductors.

8. The EMI filter of claim 7, wherein:

the first feedthrough capacitor comprises a film capacitor having a capacitance of about 0.4 microfarads;

the second feedthrough capacitor comprises a film capacitor having a capacitance of about 0.4 microfarads; and the common mode choke has an inductance of about 10 microhenries.

9. The EMI filter of claim 3 wherein the second capacitive element comprises a plurality of film capacitors.

10. The EMI filter of claim 2 further comprising:

a first feedthrough capacitor electrically connected between the first power conductor and a circuit common connection;

a second feedthrough capacitor electrically connected between the second power conductor and the circuit common connection; and a common mode choke connected in series with the first and second power conductors.

11. The EMI filter of claim 1 wherein the second capacitive element is abutting the electronic switch.

12. An EMI filter for an electric vehicle propulsion system including a power source, an electronic switch having first and second terminals, and first and second power conductors electrically connecting the first and second terminals, respectively, to the power source, comprising:

a first capacitive element electrically connected in parallel with the first and second power conductors, the first capacitive element comprising an electrolytic capacitor having a capacitance of about 3500 microfarads;

a second capacitive element comprising a plurality of film capacitors, first and second terminals, an intrinsic inductive component, and an internal capacitance component, the first and second terminals being electrically connected to the first and second power conductors, respectively;

an inductive element electrically connected in series with the power conductor, the inductive element separating the first and second capacitive elements and having an inductance of about 10 microhenries; and first and second junctions electrically connecting the first and second terminals of the second capacitive element to the first and second terminals of the electronic switch, respectively, the first and second junctions having first and second intrinsic inductive components, respectively;

wherein a sum of inductances of the first and second internal inductive components of the first and second junctions is less than 10 nanohenries, an inductance of the internal inductive component of the second capacitive element is less than 10 nanohenries, and a capacitance of the internal capacitance component is about 45 microfarads.

13. The EMI filter of claim 12 wherein the second capacitive element is abutting the electronic switch.

14. The EMI filter of claim 13 further comprising:

a first feedthrough capacitor electrically connected between the first power conductor and a circuit common connection;

a second feedthrough capacitor electrically connected between the second power conductor and the circuit common connection; and a common mode choke connected in series with the first and second power conductors;

wherein the first feedthrough capacitor comprises a film capacitor having a capacitance of about 0.4 microfarads;

the second feedthrough capacitor comprises a film capacitor having a capacitance of about 0.4 microfarads; and the common mode choke has an inductance of about 10 microhenries.

15. An EMI filter for a multiphase electric vehicle propulsion system including a power source, a plurality of electronic switches having first and second terminals, and first and second power conductors electrically connecting the first and second terminals of the plurality of electronic switches, respectively, to the power source, comprising:

a first capacitive element electrically connected in parallel with the first and second power conductors;

a second capacitive element associated with each of the plurality of electronic switches, each of the second capacitive elements having first and second terminals and an intrinsic inductive component, the first and second terminals of each of the second capacitive elements being electrically connected to the first and second power conductors, respectively;

a first inductive element electrically connected in series with the first power conductor, the first inductive element separating the first capacitive element and the plurality of second capacitive elements; and a first and second junction associated with each of the second capacitive elements, each of the first and second junctions connecting the first and second terminals of associated second capacitive elements to the first and second terminals of associated electronic switches, respectively, each of the plurality of first and second junctions having first and second intrinsic inductive components;

wherein a sum of inductances of the first and second intrinsic inductive components associated with each first and second junctions is less than an inductance of the intrinsic inductive component of the associated second capacitive element.

16. The EMI filter of claim 15 wherein the inductance of the intrinsic inductive component of each of the second capacitive elements is less than 10 nanohenries.

17. The EMI filter of claim 16 wherein the first capacitive element comprises an electrolytic capacitor.

18. The EMI filter of claim 15 wherein each electronic switch is abutting each associated second capacitive element.

19. The EMI filter of claim 18 wherein each second capacitive element comprises a film capacitor.

20. The EMI filter of claim 18 wherein each second capacitive element comprises a polypropylene film capacitor.

21. The EMI filter of claim 18 wherein each second capacitive element comprises a plurality of film capacitors.

22. The EMI filter of claim 18, wherein:

the first capacitive element has a capacitance of about 3500 microfarads;

each second capacitive element has a capacitance of about 45 microfarads; and the inductor has an inductance of about 10 microhenries.

23. The EMI filter of claim 22 further comprising a first feedthrough capacitor electrically connected between the first power conductor and a circuit common connection;

a second feedthrough capacitor electrically connected between the second power conductor and the circuit common connection; and a common mode choke connected in series with the first and second power conductors.

24. The EMI filter of claim 23, wherein:

the first feedthrough capacitor comprises a film capacitor, the first feedthrough capacitor having a capacitance of about 0.4 microfarads;

the second feedthrough capacitor comprises a film capacitor, the second conductor through capacitor having a capacitance of about 0.4 microfarads; and the common mode choke has an inductance of about 10 microhenries.

25. The EMI filter of claim 15 further comprising:

a first feedthrough capacitor electrically connected between the first power conductor and a circuit common connection;

a second feedthrough capacitor electrically connected between the second power conductor and the circuit common connection; and a common mode choke connected in series with the first and second power conductors.

* * * * *